(12) United States Patent
Zhou

(10) Patent No.: US 8,151,312 B2
(45) Date of Patent: Apr. 3, 2012

(54) POINT-READING DEVICE AND METHOD FOR OBTAINING THE NETWORK AUDIO/VIDEO FILES

(75) Inventor: Chaohui Zhou, Beijing (CN)

(73) Assignees: Aigo Digital Technology Co., Ltd., Beijing (CN); Beijing Huaqi Digital Lab Co., Ltd., Beijing (CN)

( * ) Notice: Subject to any disclaimer, the term of this patent is extended or adjusted under 35 U.S.C. 154(b) by 438 days.

(21) Appl. No.: 12/307,523

(22) PCT Filed: Apr. 24, 2007

(86) PCT No.: PCT/CN2007/001361
§ 371 (c)(1),
(2), (4) Date: Jan. 5, 2009

(87) PCT Pub. No.: WO2008/006273
PCT Pub. Date: Jan. 17, 2008

(65) Prior Publication Data
US 2009/0210919 A1    Aug. 20, 2009

(30) Foreign Application Priority Data

| Jul. 3, 2006 | (CN) | 2006-10089565 |
|---|---|---|
| Jul. 3, 2006 | (CN) | 2006-10089566 |
| Jul. 3, 2006 | (CN) | 2006-10089567 |
| Jul. 3, 2006 | (CN) | 2006-10089568 |

(51) Int. Cl.
*H04N 7/173* (2006.01)
*H04N 7/16* (2006.01)

(52) U.S. Cl. ......... 725/116; 725/118; 725/146; 725/148

(58) Field of Classification Search .......... 725/114–118, 725/144–148
See application file for complete search history.

(56) References Cited

U.S. PATENT DOCUMENTS
5,640,193 A     6/1997  Wellner
(Continued)

FOREIGN PATENT DOCUMENTS
CN       1311883 A    9/2001
(Continued)

OTHER PUBLICATIONS

International Search Report for PCT/CN2007/001361, completed Jul. 15, 2007.

*Primary Examiner* — Kieu Oanh T Bui
(74) *Attorney, Agent, or Firm* — Buchanan Ingersoll & Rooney PC

(57) ABSTRACT

A point-reading device for obtaining network audio/video files includes an image reading unit for obtaining image codes including information codes representing audio/video target files. A digital processing unit connected with the image reading unit receives the image codes sent from the image reading unit and decodes the image codes to obtain the information codes representing the audio/video target files. A memory for storing data, connected with the digital processing unit stores an information table that identifies the corresponding relationships between the information codes representing the audio/video target files and attribute information used for obtaining the audio/video target files. A network module establishes a connection between the digital processing unit and a network server. An operation system supporting network protocol is provided in the digital processing unit. The digital processing unit obtains the attribute information corresponding to the information codes according to the information table, and controls the network module to obtain the network audio/video target files stored at network servers according to the attribute information. The digital processing unit has an embedded operation system which supports the network protocol.

13 Claims, 4 Drawing Sheets

U.S. PATENT DOCUMENTS

| | | | |
|---|---|---|---|
| 5,804,803 | A | 9/1998 | Cragun et al. |
| 5,971,277 | A | 10/1999 | Cragun et al. |
| 6,446,871 | B1 | 9/2002 | Buckley et al. |
| 7,577,662 | B2 * | 8/2009 | Kasatani ............... 1/1 |
| 2003/0162595 | A1 * | 8/2003 | Serbanescu ............ 472/1 |
| 2004/0034787 | A1 | 2/2004 | Kitani |
| 2006/0085416 | A1 | 4/2006 | Naoi et al. |
| 2007/0192872 | A1 * | 8/2007 | Rhoads et al. ............ 726/26 |

FOREIGN PATENT DOCUMENTS

| | | |
|---|---|---|
| CN | 1464480 A | 12/2003 |
| CN | 200420067103 | 7/2005 |
| TW | 237232 B | 8/2005 |
| WO | WO 99/66441 A1 | 12/1999 |

* cited by examiner

POINT-READING DEVICE AND METHOD FOR OBTAINING THE NETWORK AUDIO/VIDEO FILES

FIELD OF THE INVENTION

The invention relates to a technology for information-sending and information-obtaining and, more particularly, to a point-reading device and method for utilizing the coded information of the target files, which is pre-set on the objects' surface, to obtain the audio/video files which are on the network servers.

BACKGROUND OF THE INVENTION

With the development of the Internet, the network resource has become a necessary information source in the people's daily pursuit life. More and more data would be stored at network servers to facilitate obtaining, but people usually worry about how to obtain the desired information from the vast network resource. In addition, it has become a fashion to obtain information via the Internet, but many people are still unable to go online or persecuted by the time and energy spent on going online to obtain the network resource.

In addition, It has been mature for the present method to make image codes on paper or other objects and the device applying the image codes. The present technology, such as China patent NO. 02122633.4 and China patent NO. 200420067103.1, is: pre-setting the image codes on the object surface on which printed target object, obtaining the codes via a image-reading device, decoding the codes by a processing unit to obtain the corresponding information, such as audio information etc, stored in the memory, so that it is accomplished that the relevant information corresponding to the target object could be heard or seen by clicking the target on the object with a device such as a stylus. If the above technology could be combined with network technology, a very convenient device for obtaining the network audio/video files could be provided for users.

SUMMARY OF THE INVENTION

The purpose of the present invention is to provide a point-reading device for obtaining the network audio/video files by reading image codes on the table-on-demand while without need of operating computer artificially by the users.

The purpose of the present invention is to provide a method for obtaining the network audio/video files via the point-reading device reading image codes on the table-on-demand while without the need of operating computer artificially by the users.

The purpose and technical solution of the present invention is achieved by the following technical scheme. A point-reading device for obtaining the network audio/video files, which is proposed according to the invention, comprises: an image reading unit for obtaining the image codes including the information codes representing the audio/video target files; a digital processing unit connecting with the image reading unit, receiving the image codes sent from the image reading unit and decoding the image codes to obtain the information codes representing the audio/video target files; a memory for storing data, connecting with the digital processing unit, and storing the information table that creating the corresponding relation between the information codes representing the audio/video target files and the attribute information used for obtaining the audio/video target files; a network module for establishing the connection between the digital processing unit and the network server; wherein a operation system supporting network protocol is provided in the digital processing unit. The digital processing unit obtains the attribute information corresponding to the information codes according to the information table, and controls the network module to obtain the network audio/video target files stored at the network servers according to what the attribute information provides.

The purpose and technical solution of the present invention can be further achieved by using the following technical measures.

The above-mentioned point-reading device for obtaining the network audio/video files also comprises an audio processing unit connecting each other with a speaker, and/or a video processing unit connecting each other with a display screen. The audio processing unit and the video processing unit are connected to the digital processing unit respectively, The audio/video files sent from the network module are output to the audio processing unit and the video processing unit respectively by the digital processing unit, the above-mentioned audio processing unit extracts and decodes the received audio files and take the digital-analog conversion (DAC), the above-mentioned speaker plays the processed audio files; the above-mentioned video processing unit extracts and decodes the received video files so that the above-mentioned processed video files could be played on the above-mentioned display screen.

The above-mentioned point-reading device for obtaining the network audio/video files, wherein the attribute information of the target files is Name Information of the audio/video target files; the memory stores the network addresses of search engines and the search instruction for controlling the network module to obtain the addresses of the network servers storing the audio/video target files according to the Name Information and the network addresses of the search engines; the digital processing unit sends search instruction to the network module after receiving the Name Information of the target files.

The above-mentioned point-reading device for obtaining the network audio/video files, wherein the search instruction comprises: the instruction for connecting the network module with the network addresses of search engines, so making the network module being connected to the corresponding web page; the instruction for making the search engines search the addresses of the network servers storing the target files with the same name as the Name Information of the audio/video target files; and the instruction for obtaining the search results of the search engines.

The above-mentioned point-reading device for obtaining the network audio/video files, wherein the digital processing unit selects the network servers with the fastest connection from the search results back from the network module, and obtains the audio/video target files from the network servers.

The above-mentioned point-reading device for obtaining the network audio/video files, wherein the attribute of the target files is network IP address where the audio/video target files are located. The connection instruction that controls the network module to connect to the appointed network addresses to obtain the audio/video target files is stored in the said memory; after obtaining the network IP address where the audio/video target files are located, with taking the network IP address as the above-mentioned appointed network address, the said digital processing unit sends the connection instruction to the network module.

The above-mentioned point-reading device for obtaining the network audio/video files, wherein the digital processing unit sends the audio/video target files to the network server, downloads the audio/video target files or plays them online via the network module.

The above-mentioned point-reading device for obtaining the network audio/video files, wherein the image reading unit is connected to the digital processing unit via the manner of wireless.

The above-mentioned point-reading device for obtaining the network audio/video files, wherein the image reading unit comprises optical module and image sensor, the optical module includes illuminant, lens and filter connected in turn, the image sensor is CCD sensor or CMOS sensor.

The above-mentioned point-reading device for obtaining the network audio/video files, wherein the image codes are the micro-code printed by infrared-photosensitive ink.

The purpose and technical solution of the present invention is achieved by the following technical scheme. A method proposed by the present invention for obtaining the network audio/video files includes a table-on-demand unit pre-set the image codes representing a target files and a point-reading device with the capability to read the image codes. The method comprises: A0, creating a information table obtained by decoding the image codes in the point-reading device, the information table shows the corresponding relation between the information codes representing the target files and the Name Information of the target files, storing the IP addresses of the appointed search engines and pre-setting the instruction which controls the connection between the point-reading device and the search engines, and the search instruction which make the search engines take the Name Information of the target files as the key words to search the network addresses of the network servers storing the target files with the same name as the Name Information; A1, obtaining the image codes set in the table-on-demand unit via the image reading unit of the point-reading device; A2, the digital processing unit of the point-reading device receiving the image codes obtained by the image reading unit, and decoding the image codes to obtain the information codes representing the target files. A3, the digital processing unit obtaining the Name Information of the target files corresponding with the information codes according to the information table; A4, the digital processing unit sending the instruction, which make the point-reading device be connected to the appointed search engine of the Internet, to the network module; A5, the network module of the point-reading device connecting to the search engines and obtaining the source code of the corresponding web-page; A6, the digital processing unit sending the search instruction to the network module, the Name Information of the target file which would be searched being included in the search instruction; A7, the network module transmitting the search instruction to the search engines, and make the search engines, according to the Name Information of the target files, search IP address of the network servers storing the said target files, and receives the search results fed-back by the search engines; A8, the network module transmitting the search results fed-back by the search engines to the digital processing unit; A9, connecting the point-reading device to the network servers in the search results, and downloads or plays online the target files stored in the network servers.

The purpose and technical solution of the present invention is further achieved by the following technical measures.

The above-mentioned method, wherein the method for obtaining the network audio/video files also comprises: the digital processing unit of the point-reading device selecting the IP address of the network servers with the fastest connection from the search results, and makes the point-reading device connect with the network servers so as to obtain the target files.

The purpose and technical solution of the present invention is achieved by the following technical scheme. The method proposed according to the present invention for obtaining the network audio/video files in the present invention includes a table-on-demand unit pre-set the image codes representing a target files and the point-reading device with the capability to read the image codes, the method comprises: B0, creating a information table obtained by decoding the image codes in the point-reading device, the information table shows the corresponding relation between the information codes representing the target files and the network addresses of the network servers storing the target files; B1, obtaining the image codes set in the table-on-demand unit via the image reading unit of the point-reading device; B2, the digital processing unit of the point-reading device receiving the image codes obtained by the image reading unit, and decoding the image codes to obtain the information codes; B3, the digital processing unit obtaining the network addresses of the network servers storing the target files from the information table according to the information codes representing the target files; B4, connecting the point-reading device with the network servers storing the target files according to the network addresses, and downloading or playing online the target files stored on the network servers.

The above-mentioned method, wherein the method for obtaining the network audio/video files also comprises: utilizing the different color-codes of the printing-ink to pre-set the characters or the graphics representing the target files or the target files content in the table-on-demand unit, and setting the image codes corresponding with the target files on the location corresponding to the characters or graphics. The information table is pre-set on the memory of the point-reading device.

In view of the above-mentioned technical scheme, the advantages of the point-reading device and method of the present invention for obtaining the network audio/video files are as following:

1. In the present invention, reading the image codes printed on the table-on-demand unit via the point-reading device, utilizing the information codes gained by decoding the image codes to obtain the attribute of the target files, then controlling the network module to obtain the target files stored on the network servers according to the attribute of the target files, therefore it being achieved to obtain the audio/video target files via the Internet, while the manner of obtaining the target files just like the above-mentioned enabling the users who can not or do not want to go online to obtain the target files immediately and conveniently;

2. In the present invention, the point-reading device for obtaining the target files via the Internet being able to learn the network addresses of the network servers from which the target files can be obtained by the means of searching by the search engines or pre-setting, then obtaining the audio/video target files via the IP addresses, therefore enabling the user to obtain the desired target files on the Internet rapidly and without any computer operation.

3. In the present invention, the target files obtained via the Internet may being stored in the buffer storage according to the instruction to play online, therefore making the point-reading device being able to achieve to play the desired audio/video files without the need of setting the unit for storing the target files, Moreover, the above-mentioned target files may also being stored in the memory so as to download the desired audio/video files.

EMBODIMENTS OF THE INVENTION

In order to further illustrate the technical means which is used to achieve the intended purpose and the efficacy of the present invention, the following specially describe the point-reading device and method for obtaining the network audio/video files, which are proposed according to the present invention, and its embodiments, structure, characteristics and efficacy, incorporating the accompany drawings and the preferred embodiment.

Figure 1:
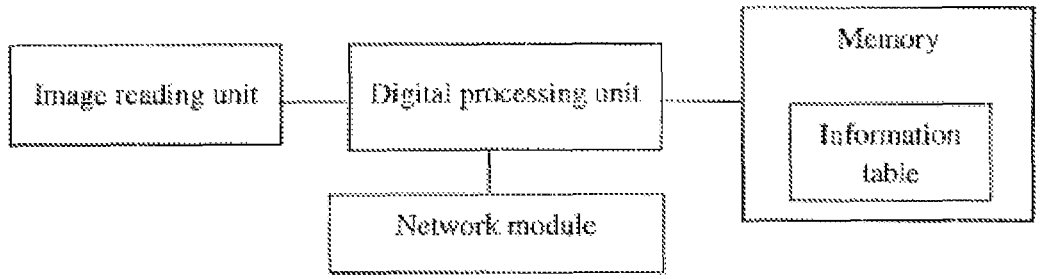
FIG. 1 schematically shows the configuration of the point-reading device in accordance with the present invention.

As shown in FIG. 1, the point-reading device of the present invention for obtaining the network audio/video files comprises: an image reading unit, it obtaining the image codes including the information codes representing the audio/video files; a digital processing unit, it being connected to the image reading unit, receiving and decoding the image codes sent from the image reading unit to obtain the information codes representing the audio/video files; a memory for storing data, it being connected to the digital processing unit, and storing the information table that establishes the corresponding relation between the information codes representing the audio/video target files and the attribute information for obtaining the audio/video target files; a network module, it establishing the connection between the digital processing unit with the network server, including a network adaptor and network interface, wherein the network adaptor is connected to the digital processing unit and the connection is established between the network interface of the above-mentioned and the network interface of external device such as PC. Wherein an operation system is provided in the digital processing unit, the operation system supports the network protocol; the digital processing unit obtains the attribute information corresponding to the information codes according to the information table, and controls the network module to obtain the audio/video target files stored in the network server according to what the attribute information provides.

The above-mentioned network adaptor establishes the connection between the digital processing unit and the network interface; The digital processing unit establishes the connection between the memory and the network interface and processes the data transmission between the memory and external device. In addition, the network module may also be set to connect to the Internet directly instead to connect to the network servers via external device such as PC etc.

Figure 2:
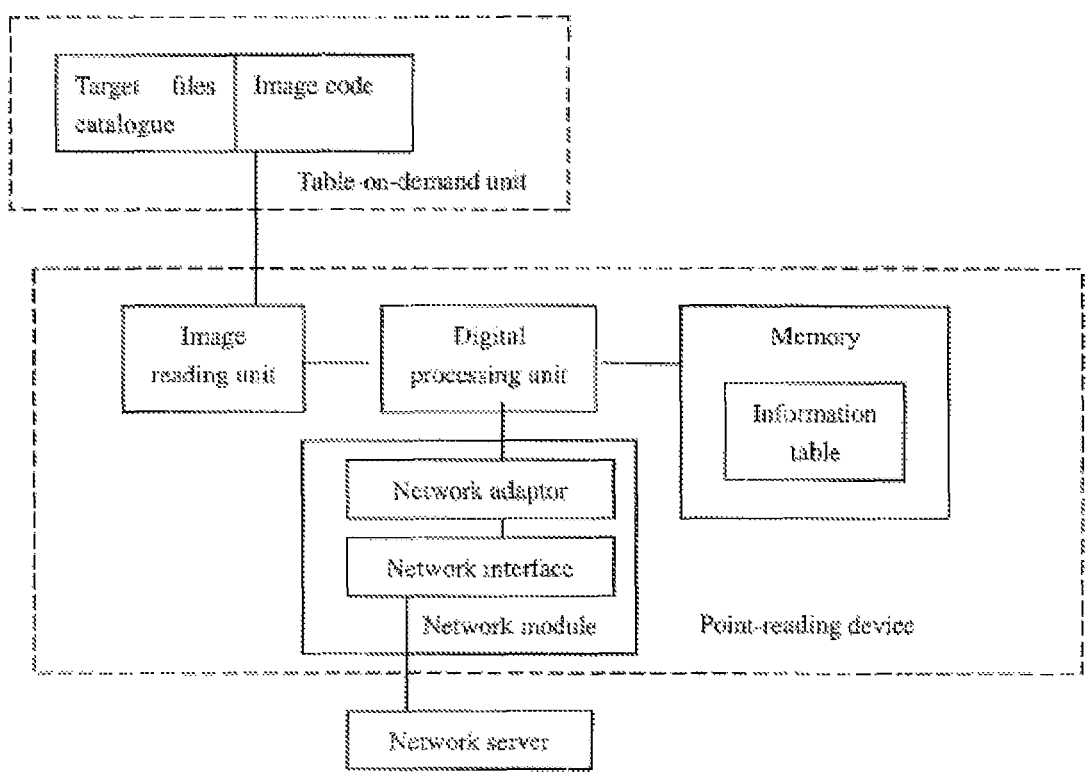
FIG. 2 schematically shows the configuration of the point-reading system for obtaining the network audio/video files in accordance with the present invention.

FIG. 2 schematically shows a structure diagram of the point-reading system for obtaining the network audio/video files in accordance with the present invention. While obtaining the network multimedia files by using the point-reading device of the present invention, the user obtains the available target files by reading the target file catalogue in the table-on-demand unit, then reads the image codes in the table-on-demand unit via using the point-reading device to obtain the information codes representing the attribute of the target files included in the image codes, and utilizes the said attribute of the target files to obtain the target files from the network servers.

Figure 3:
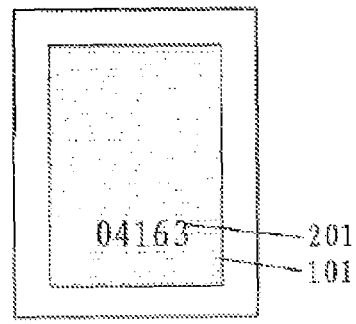
FIG. 3 schematically shows the table-on-demand unit in accordance with the present invention.

FIG. 3 shows a diagram of the table-on-demand unit in accordance with the present invention. The above-mentioned table-on-demand unit comprises the target files catalogue 201 and the image codes 101 corresponding to each of the target files, the target files content 201 and the image codes 101 are pre-set on the surface of one object with the different color-code printing-ink. The target files content 201 is the characters or graphics representing the target files. The above-mentioned image codes 101 includes the information codes representing the attribute of the target files, and the above-mentioned characters or graphics representing the target files is set corresponding to the image codes 101 including the information codes representing the attribute of the target files. As shown in the figure, the characters and their number for ordering the song named "彩虹" is mounted on an object surface as the target file content, the image codes 101 is set in the region shared by the characters and their number. The object on which the target files content 201 and the image code 101 are printed is made of paper or plastic.

In particular, the image reading unit may comprise optical module and image sensor. The optical module mainly includes illuminant, lens, and filter connected in turn. The illuminant light the regions where the image codes 101 could be recognized, the lens magnifies the image of the image codes 101, the image is filtered by the filter. The image sensor obtains the optical information filtered by the filter, and output it after translates it into digital electrical signal. It is suitable to provide a Infrared light source as the above-mentioned illuminant, and two Infrared lights are preferred. The image sensor is CCD sensor or CMOS sensor. The light emitted from the image obtaining unit can be the light with other particular color such as blue, etc.

The image codes 101 is a layer of dots on the surface of paper or the other objects, which is printed with the Infrared sensitive printing-inks or the printing-inks with other particular color (In the Figure, the dots layer are magnified in certain multiples, in normal situation, dots are not easily to be identified by a naked eye). In order to avoid the bad situation of reading wrongly or inaccurately, the color-code of printing-inks used for the dots is not allowed to be same with the color-code of the printing-inks used for the target file catalogue 201 or the objects' surface. The technology about the setting of the image codes and obtaining the image by the image reading unit have been described in China Application No. 02122633.4 and China Patent No. 200420067103.1, so no more detailed here.

Figure 4:
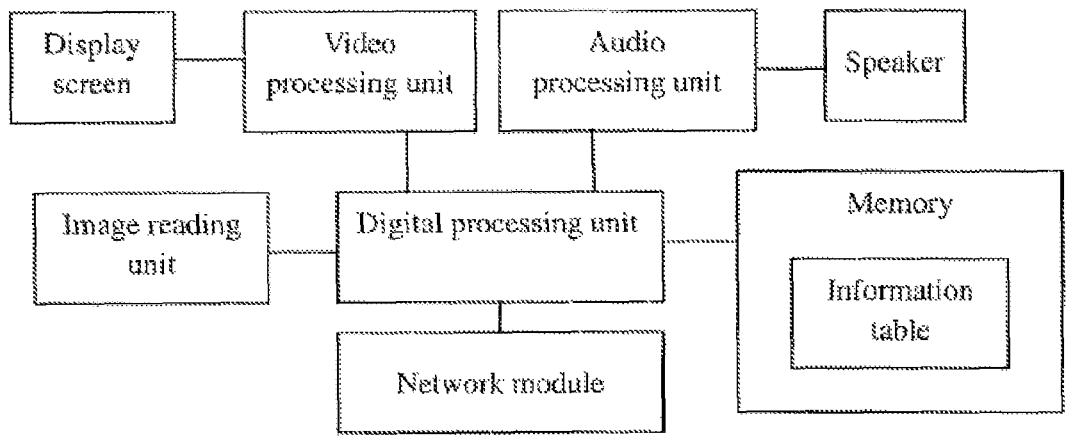
FIG. 4 schematically shows the configuration of the point-reading device provided with speaker and display screen in accordance with the present invention.

Reference to the FIG. 4, the figure is shows a structure schematic diagram of the point-reading device mount provided with speaker and display screen in accordance with the present invention. Wherein, Therein the point-reading device also comprises an audio processing unit, a speaker connecting each other, or/and a video processing unit, a display screen connecting each other. The audio processing unit and the video processing unit are respectively connected with to the digital processing unit respectively, the digital processing unit transmits outputs the audio/video files sent from the network module to the audio processing unit and the video processing unit respectively, and then the above-mentioned audio processing unit extracts and decodes the received audio files and converses digital analog takes the digital-analog conversion (DAC), the above-mentioned speaker plays the processed audio files; the above-mentioned video processing unit decompresses extracts and decodes the received video files so that as to the above-mentioned display screen could play the processed video files on the display screen. Via the above-mentioned device structure setup, enable the target files obtained from the network servers to be processed in the point-reading device and to play out.

The above-mentioned digital processing unit comprises a buffer storage, the digital processing unit receives the audio/video target files sent from the network module, and stores the said target files in the buffer storage to play online. Moreover, the above-mentioned digital processing unit can as well control the audio/video target files sent from the network module to store in the memory.

In more specially details, the above-mentioned point-reading device can separates the image reading unit from its main body including the digital processing unit by manner of wireless or with cable. For example, the above-mentioned image reading unit comprises a first wireless network interface, the digital processing unit comprises a second wireless network interface that can transmit data with the first wireless network interface.

The attribute of the target files is either the Name Information of the audio/video target files, or the network addresses of the servers storing the audio/video target files. If the attribute of the target files is the Name Information, the point-reading device of the present invention may obtain the network addresses of the network server storing the target files with the same Name Information via searching by the search engines, so that the target files may be obtained from the network server.

Figure 5:
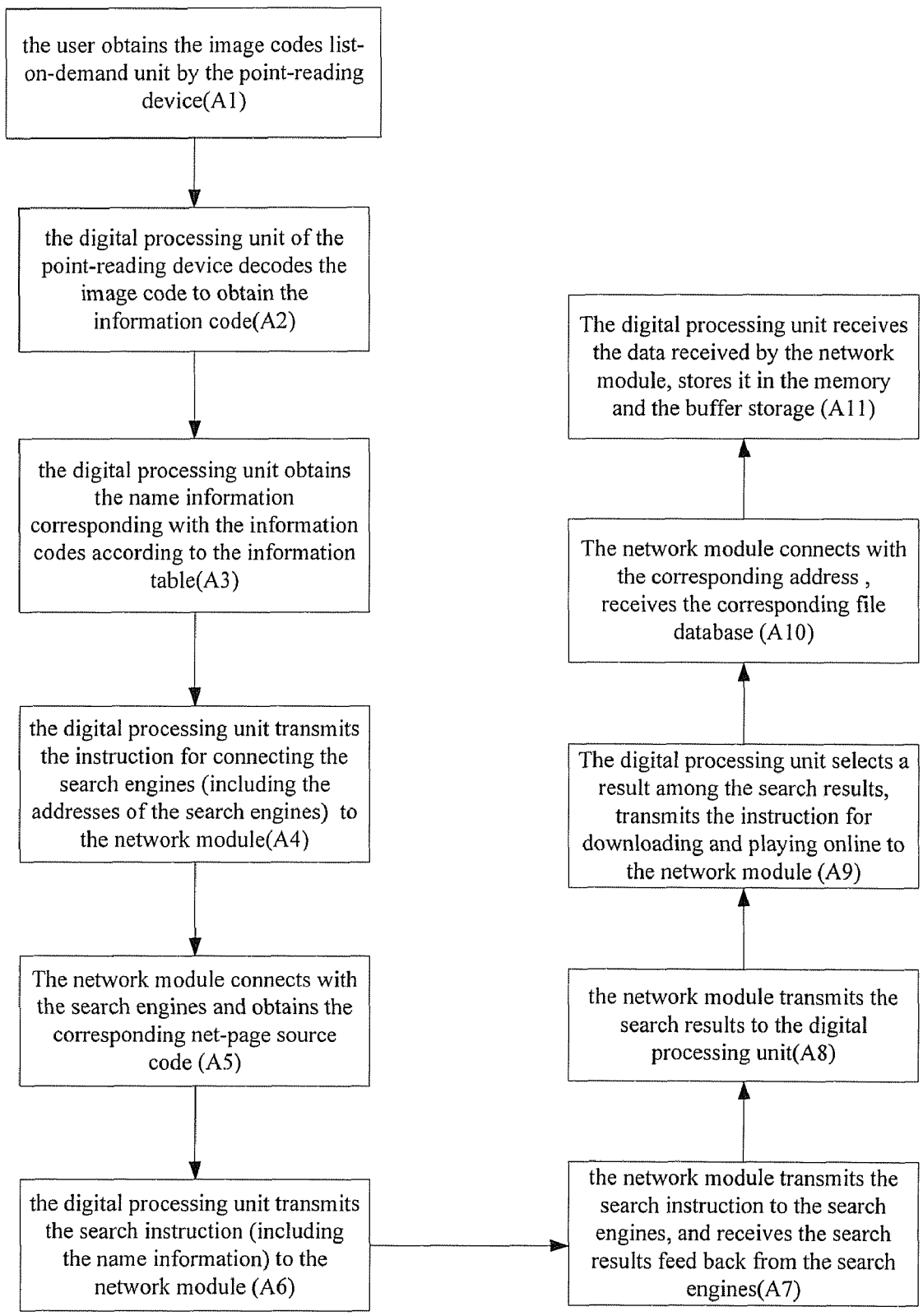
FIG. 5 is a flow diagram of an embodiment about the point-reading device obtaining the target files, according to the present invention.

Reference to FIG. 5, the figure is a flow diagram of an embodiment about the point-reading device obtaining the target files, according to the present invention. In the embodiment, the point-reading device of the present invention learns the Name Information of the desired target files via the image codes, thereby connects the search engines to execute the duty of search and receiving the target files. The method that the user obtains the audio/video target files using the network servers by the point-reading device is as following:

A0, creating a information table obtained by decoding the image codes in the point-reading device, the information table shows the corresponding relation between the information codes representing the target files and the Name Information of the target files, storing the IP addresses of the appointed search engines and pre-setting the instruction which controls the connection between the point-reading device and the search engines, and the search instruction which make the search engines take the Name Information of the target files as the key words to search the network addresses of the network servers storing the target files with the same name as the Name Information;

A1, the user learns the character or graphics of the obtainable target files via the table-on-demand unit, then obtains the pre-set image codes on the location corresponding to the character or graphic of the selected target files using the image reading unit of the point-reading device.

A2, the digital processing unit of the point-reading device receiving the image codes obtained by the image reading unit, and decoding the image codes to obtain the information codes representing the target files;

A3, the digital processing unit obtaining the Name Information of the target files corresponding with the information codes according to the information table;

A4, the digital processing unit sending the instruction, which make the point-reading device be connected to the appointed search engine of the Internet, to the network module;

A5, the network module of the point-reading device connecting to the search engines and obtaining the source code of the corresponding web-page;

A6, the digital processing unit sending the search instruction to the network module, the Name Information of the target file which would be searched being included in the search instruction;

A7, the network module transmitting the search instruction to the search engines, and make the search engines, according to the Name Information of the target files, search IP address of the network servers storing the said target files, and receives the search results fed-back by the search engines;

A8, the network module transmitting the search results fed-back by the search engines to the digital processing unit;

A9, connecting the point-reading device to the network servers in the search results, and downloads or plays online the target files stored in the network servers.

In particular, after the digital processing unit receives the search results, the following steps also are included:

A10, selecting a result from the search results, and transmitting the instruction of downloading or playing online to the network module, the network module connects to the network addresses indicated in the selected search results, thereby obtains the corresponding audio/video target files, and sends the obtained target files to the digital processing unit.

A11, the digital processing unit stores the received audio/video target files in the memory or the buffer storage according to the instruction of downloading or playing online.

The above-mentioned digital processing unit may select the network addresses of the network servers with the fastest connection from the search results fed back from the network module, and makes the network module connect to the network servers, and obtains the target files stored in the network servers.

If the attribute of the above-mentioned target files is the network addresses of the network servers where the audio/video target files be, the point-reading device of the present invention obtains the target files via connecting the network addresses of the network servers.

Figure 6:
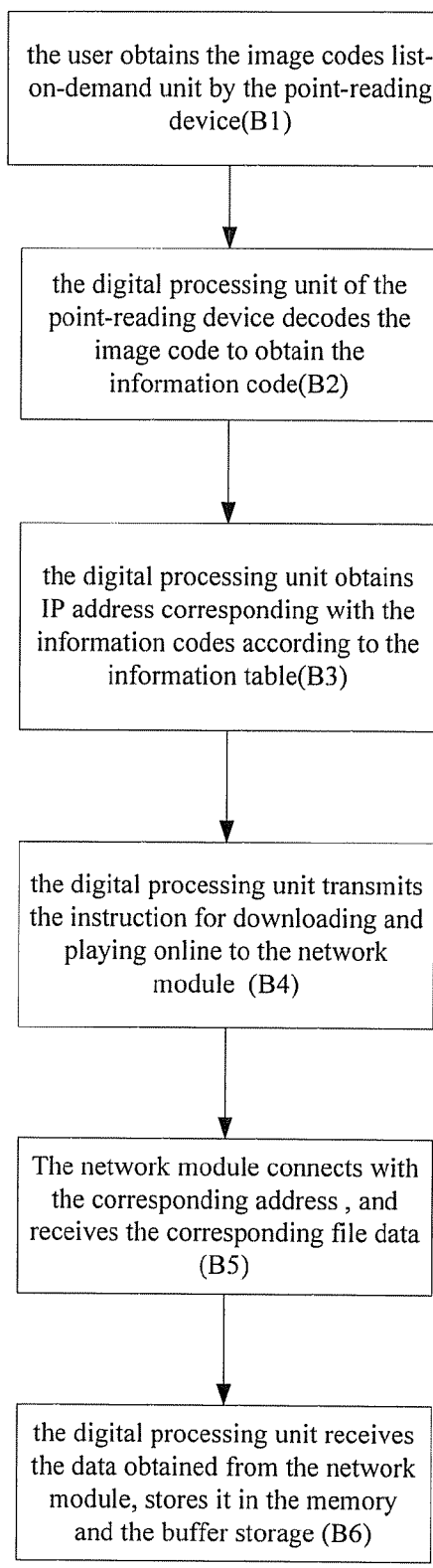
FIG. 6 is a flow diagram of another embodiment about the point-reading device obtaining the target files, according to the present invention.

Reference to the FIG. 6, the figure is a flow diagram of another embodiment about the point-reading device obtaining the target files, according to the present invention. In the embodiment, the point-reading device learns the network address of the network servers storing the target files via the image codes, then may connect to the network addresses and obtains the target files. The method that the user obtains the audio/video target files from the network server using the point-reading device is as followings:

B0, creating a information table obtained by decoding the image codes in the point-reading device, the information table shows the corresponding relation between the information codes representing the target files and the network addresses of the network servers storing the target files;

B1, the user learns the character or graphics of the obtainable target files via the table-on-demand unit, then obtains the pre-set image codes on the location corresponding to the character or graphic of the selected target files using the image reading unit of the point-reading device.

B2, the digital processing unit of the point-reading device receiving the image codes obtained by the image reading unit, and decoding the image codes to obtain the information codes;

B3, the digital processing unit obtaining the network addresses of the network servers storing the target files from the information table according to the information codes representing the target files;

B4, connecting the point-reading device with the network servers storing the target files according to the network addresses, and downloading or playing online the target files stored on the network servers.

In particular, after the digital processing unit receives the search results, the following steps are also included:

B5, the digital processing unit transmits the instruction of downloading or playing online to the network module, according to the instruction, the network module obtains the audio/video target files from the network servers, and sends the said target files to the digital processing unit.

B6, the digital processing unit stores the received audio/video target file data in the memory or the buffer storage according to the instruction of downloading or playing online, so that the function of downloading or playing online is achieved.

In addition, according to the obtained attribute information of the target files, the point-reading device of the present invention can judge what it has obtained is either the name information of the target files or the network addresses of the network servers storing the target files, thereby the corresponding treatment can be taken differentiated. The point-reading device of the present invention obtains the corresponding information via the image codes, and the corresponding treatment can be taken according to the judgment whether the corresponding information is the Name Information of the target files or the network addresses of the network servers storing the target file, so as to receive the target files. That is, the user may also take the point-reading device to obtain the audio/video target files stored in the network servers by the following method:

After obtaining the attribute information of the target files corresponding with the information codes according to the information table, the digital processing unit judges whether the attribute information is the Name Information of the target files or the network addresses of the network servers storing the target files, if the attribute information is the Name Information of the target files, the step A4 is executed; if the attribute information is the network addresses information of the network servers storing the target files, the step B4 is executed.

The invention claimed:

1. A point-reading device for obtaining network audio/video files, comprising:
   an image reading unit for obtaining image codes including information codes representing audio/video target files;
   a digital processing unit connecting with the image reading unit, receiving the image codes sent from the image reading unit and decoding the image codes to obtain the information codes representing the audio/video target files;
   a memory for storing data, connecting with the digital processing unit, and storing an information table that identifies the corresponding relationships between the information codes representing the audio/video target files and attribute information used for obtaining the audio/video target files;
   a network module for establishing a connection between the digital processing unit and a network server;
   wherein an operation system supporting network protocol is provided in the digital processing unit, wherein the digital processing unit obtains the attribute information corresponding to the information codes according to the information table, and controls the network module to obtain the network audio/video target files stored at network servers according to the attribute information; and
   wherein said image codes comprise micro-code printed by infared-photosensitive ink.

2. The point-reading device for obtaining network audio/video files according to claim 1, wherein said point-reading device further comprises an audio processing unit connecting with a speaker, and/or a video processing unit connecting with a display screen, wherein the audio processing unit and the video processing unit are connected to the digital processing unit respectively, wherein the audio/video files sent from the network module are output to the audio processing unit and the video processing unit respectively by the digital processing unit, wherein the audio processing unit extracts and decodes the received audio files and performs digital-analog conversion (DAC), wherein the speaker plays the converted audio files; and wherein the video processing unit extracts and decodes the received video files so that the decoded video files can be presented on the display screen.

3. The point-reading device for obtaining network audio/video files according to claim 1, wherein said attribute information of the target files is Name Information of the audio/video target files; wherein the memory stores the network addresses of search engines and a search instruction for controlling the network module to obtain the addresses of the network servers storing the audio/video target files according to the Name Information and the network addresses of the search engines; and wherein the digital processing unit sends the search instruction to the network module after receiving the Name Information of the target files.

4. The point-reading device for obtaining network audio/video files according to claim 3, wherein said search instruction comprises:
   an instruction for connecting the network module with the network addresses of search engines, to connect the network module to a corresponding web page;
   an instruction for making the search engines search the addresses of the network servers storing the target files with the same name as the Name Information of the audio/video target files; and
   an instruction for obtaining the search results of the search engines.

5. The point-reading device for obtaining network audio/video files according to claim 3, wherein said digital processing unit sends the audio/video target files to the network server, downloads the audio/video target files or plays them online via the network module.

6. The point-reading device for obtaining network audio/video files according to claim 4, wherein said digital processing unit selects network servers with the fastest connection from the search results sent back to the network module, and obtains the audio/video target files from the selected network servers.

7. The point-reading device for obtaining network audio/video files according to claim 1, wherein said attribute of the target files includes a network IP address where the audio/video target files are located, wherein a connection instruction that controls the network module to connect to an identified network address to obtain the audio/video target files is stored in said memory; and
   wherein, after obtaining network IP address where the audio/video target files are located, and using the network IP address as said identified network address, said digital processing unit sends the connection instruction to the network module.

8. The point-reading device for obtaining network audio/video files according to claim 1, wherein said image reading unit is connected to said digital processing unit in a wireless manner.

9. The point-reading device for obtaining network audio/video files according to claim 1, wherein said image reading unit comprises an optical module and an image sensor, the optical module includes an illuminant, lens and filter connected in series, and said image sensor is CCD sensor or CMOS sensor.

10. A method for obtaining network audio/video files via a table-on-demand unit containing image codes representing target files and a point-reading device with the capability to read the image codes; said method comprising:

creating an information table obtained by decoding the image codes in the point-reading device, the information table indicating corresponding relationships between information codes representing the target files and Name Information of the target files, storing IP addresses of appointed search engines and pre-setting an instruction which controls a connection between the point-reading device and the search engines, and a search instruction which causes the search engines to use the Name Information of the target files as key words to search the network addresses of network servers storing target files with the same name as the Name Information;

obtaining the image codes in the table-on-demand unit via the image reading unit of the point-reading device;

a digital processing unit of the point-reading device receiving the image codes obtained by the image reading unit, and decoding the image codes to obtain the information codes representing the target files;

the digital processing unit obtaining the Name Information of the target files corresponding with the information codes according to the information table;

the digital processing unit sending an instruction, which causes the point-reading device be connected to an appointed search engine of the Internet, to the network module;

a network module of the point-reading device connecting to the search engines and obtaining the source code of a corresponding web-page;

the digital processing unit sending the search instruction to the network module, the Name Information of the target file to be searched being included in the search instruction;

the network module transmitting the search instruction to the search engines, to cause the search engines, according to the Name Information of the target files, search the IP address of the network servers storing said target files, and receive the search results fed-back by the search engines;

the network module transmitting the search results fed-back by the search engines to the digital processing unit; and connecting the point-reading device to the network servers in the search results, and downloading or playing online the target files stored in the network servers, wherein said image codes comprise micro-code printed by infared-photosensitive ink.

11. The method according to claim 10, wherein said method for obtaining network audio/video file further comprises:

the digital processing unit of the point-reading device selecting the IP address of the network servers with the fastest connection from the search results, and causing the point-reading device to connect with the selected network servers so as to obtain the target files.

12. A method for obtaining network audio/video files via a table-on-demand unit containing image codes representing target files and a point-reading device with the capability to read the image codes; said method comprising:

creating an information table obtained by decoding the image codes in the point-reading device, the information table indicating corresponding relationships between information codes representing the target files and the network addresses of network servers storing the target files;

obtaining the image codes in the table-on-demand unit via the image reading unit of the point-reading device;

a digital processing unit of the point-reading device receiving the image codes obtained by the image reading unit, and decoding the image codes to obtain the information codes;

the digital processing unit obtaining network addresses of the network servers storing the target files from the information table according to the information codes representing the target files; and connecting the point-reading device with the network servers storing the target files according to the network addresses, and downloading or playing online the target files stored on the network servers, wherein the information table, which shows the corresponding relationships between the information codes of the target files by decoding the image codes and the network addresses of the network servers storing said target files, is created in the point-reading device, wherein said image codes comprise micro-code printed by infared-photosensitive ink.

13. The method according to claim 12, wherein said method for obtaining network audio/video files also comprises:

utilizing different color-codes of printing-ink to form characters or graphics representing the target files or the target files content in the table-on-demand unit, and setting the image codes corresponding with the target files on the location corresponding to the characters or graphics, wherein the information table is stored in the memory of the point-reading device, and wherein, in the list-on-demand unit, the different color printing-ink is employed to form letters or figures representing the target files or a target files catalogue, as well as the image codes corresponding with the target files being correspondingly formed by said letters or figures.

* * * * *